(12) United States Patent
Camus

(10) Patent No.: US 8,370,999 B2
(45) Date of Patent: Feb. 12, 2013

(54) CLIP FOR HOLDING TWO PARTS TOGETHER

(75) Inventor: Pascal Camus, Vif (FR)

(73) Assignee: A. Raymond Et Cie, Grenoble (FR)

( * ) Notice: Subject to any disclaimer, the term of this patent is extended or adjusted under 35 U.S.C. 154(b) by 209 days.

(21) Appl. No.: 12/936,274

(22) PCT Filed: May 5, 2009

(86) PCT No.: PCT/EP2009/003208
§ 371 (c)(1), (2), (4) Date: Oct. 4, 2010

(87) PCT Pub. No.: WO2009/135643
PCT Pub. Date: Nov. 12, 2009

(65) Prior Publication Data
US 2011/0209309 A1 Sep. 1, 2011

(30) Foreign Application Priority Data
May 7, 2008 (FR) ...................................... 08 02547

(51) Int. Cl.
*F16B 5/12* (2006.01)
*F16B 2/24* (2006.01)
(52) U.S. Cl. ............ 24/295; 24/458; 24/292; 24/581.11
(58) Field of Classification Search ............ 24/292–297, 24/458, 581.11
See application file for complete search history.

(56) References Cited

U.S. PATENT DOCUMENTS

| | | | |
|---|---|---|---|
| 3,977,048 A * | 8/1976 | Benedetti ........................ | 24/293 |
| 6,154,933 A | 12/2000 | Vetter et al. | |
| 6,353,981 B1 * | 3/2002 | Smith .............................. | 24/295 |
| 6,381,811 B2 * | 5/2002 | Smith et al. ..................... | 24/289 |
| 6,718,599 B2 * | 4/2004 | Dickinson et al. .............. | 24/295 |
| 6,868,588 B2 * | 3/2005 | Dickinson et al. .............. | 24/295 |
| 6,918,162 B2 * | 7/2005 | Bodo .............................. | 24/293 |
| 6,928,705 B2 * | 8/2005 | Osterland et al. ............... | 24/295 |
| 7,120,971 B2 * | 10/2006 | Osterland et al. ............... | 24/295 |
| 7,399,151 B2 * | 7/2008 | Lubera et al. .................. | 411/522 |
| 7,428,770 B2 * | 9/2008 | Dickenson et al. ............. | 24/295 |
| 7,784,159 B2 * | 8/2010 | Dickinson et al. .............. | 24/295 |
| 2003/0024078 A1 | 2/2003 | Vassiliou | |
| 2003/0233738 A1 * | 12/2003 | Osterland et al. ............... | 24/293 |
| 2008/0028577 A1 * | 2/2008 | Soman et al. ................... | 24/293 |

FOREIGN PATENT DOCUMENTS

| | | |
|---|---|---|
| DE | 29812707 U1 | 12/1998 |
| WO | WO02/070905 A2 | 9/2002 |

OTHER PUBLICATIONS

The International Search Report and Written Opinion from parent application No. PCT/EP2009/003208 mailed Nov. 23, 2009.

* cited by examiner

*Primary Examiner* — Robert J Sandy
*Assistant Examiner* — Louis Mercado
(74) *Attorney, Agent, or Firm* — Faegre Baker Daniels

(57) ABSTRACT

A clip for holding first and second parts together snaps into an opening in a first part and includes a central housing for receiving and retaining a male portion on a second part using catches. The clip has a spring structure allowing sideways displacement of the catches so that it occupies either a locked position in which it projects into the central housing to prevent axial movement of the male portion, or a position of release of the male portion in which it is withdrawn from the central housing. The clip also includes a mechanism for causing the catches to move to their locked positions automatically by snapping the clip onto the first part.

4 Claims, 5 Drawing Sheets

CLIP FOR HOLDING TWO PARTS TOGETHER

CROSS-REFERENCE TO RELATED APPLICATION

This application is a U.S. National Phase Patent Application based on International Application Serial No. PCT/EP2009/003208 filed May 5, 2009, the disclosure of which is hereby explicitly incorporated by reference herein.

BACKGROUND OF THE INVENTION

1. Field of the Invention

The present invention relates to a clip for holding a first and a second part together.

2. Description of the Related Art

These types of mounting clips find numerous applications, in particular in the automotive industry for mounting two pieces of equipment together. In particular, the clip can be used for mounting trim on an element of the vehicle structure. This trim is visible inside the cabin and for esthetic reasons the mounting must be invisible.

A mounting clip of the above mentioned type is described in document EP1482184 in which the mounting clip comprises a summit base from which a pair of external lateral legs is extending and between which is placed a pair of internal lateral legs, also connected to the summit base. The flexible external legs comprise elements that snap in the opening of the first piece. Each internal leg, adjacent to an associated external leg, comprises a first portion connected to the summit base and is extended by a second portion which is bent backward towards the inside of the clip in direction of the summit base. Each second portion is composed of an inside directed folding zone and a blade with free lateral displacement. The blades of the two internal legs, directly opposite of each other, delimit between them a central space for axial insertion of a tang carried by the second piece. Each blade with free lateral displacement carries a catch element for the tang, pointing in direction of the central space in order to retain the tang inside the central space. The catch elements are projecting continually inside the central space, regardless of the status of the clip, in other words whether or not the clip is snapped in the first piece and whether or not the tang of the second piece is inserted in the central space.

Because of this projecting arrangement of the catch elements, the axial insertion of the tang of the second piece results in external deterioration of the tang, in the form of permanent superficial deformations such as cuts or scores, which are axially generated by the catch elements. The deterioration of the tang results in a less reliable mounting of the second piece, which becomes susceptible of vibrating and therefore a source of noise, even resulting in fortuitous detachment of the second piece. In addition, the force for installing the clip on the tang is high taking into account the interaction between the catch elements and the tang.

On the other hand, starting from the normal situation where the second piece is attached to the first piece by means of the clip in snapped position, any axial displacement of the tang (resulting from an axial force applied on the tang) provokes a corresponding axial withdrawal of the clip (thanks to the engagement of the catch elements in the tang) relative to the opening of the first piece. This axial movement of the clip is accompanied by a progressive withdrawal of the catch elements, involving reduced retention relative to the second piece. Therefore, the fastening of the clip to the second piece decreases progressively as soon as the clip starts to withdraw axially, notwithstanding that the clip is still snapped in the first piece. In other words, from the beginning of the axial withdrawal of the clip, the retention quality of the second piece by the clip decreases in inverse proportion to the value of the axial displacement of the clip, with as consequence reduced reliability of the mounting of the second piece, which is susceptible of vibrating and of becoming a source of noise. In case of voluntary disassembly of the mounting between pieces, sliding is even likely to occur between the clip and the mounting tang of the second piece.

SUMMARY OF THE INVENTION

The present invention provides a mounting clip which is easy to install and improves the mounting together of the parts, the clip having a first part with an opening in which the clip is snapped and the second part has a tang which is inserted in said opening, and the clip comprises: a summit base; a pair of external lateral legs which are elastically returned in lateral direction towards the outside of the clip, after axially inserting said external legs in the opening in order to engage the external legs and to ensure that the clip is snapped in the first piece; a pair of internal lateral legs, each adjacent to an associated external leg and delimiting, in combination with the summit base, a central space in which the tang is axially inserted between the internal legs; and a catch element carried by each internal leg in direction of the central space for retaining the tang in the central space.

The mounting clip according to the invention is remarkable in that each internal leg comprises elastic means for the lateral displacement of the corresponding catch element, in order to occupy selectively a locking position projecting inside the central space for axial blocking of the tang, or a release position where the tang is withdrawn from the central space, and in that the clip is provided with means for actuating the displacement of the catch elements towards their locking positions, which is commanded automatically by snapping the clip in the first piece.

The interlocking of the catch elements with the mounting tang occurs when the tang is already axially in place in the central space of the clip. The mounting is not causing any external deterioration and the forces for installing the clip on the tang are low. On the other hand, the locking position remains in effect as long as the clip is snapped in place, in other words as long as the snap action has not ended. The snap action only ends after a predetermined axial travel of the clip relative to the first piece. In this way, the connection between the clip and the second piece is firmly maintained at the start of the axial withdrawal of the clip. As long as the snap action of the clip in the first piece does not end, the locking position is maintained and the retention of the second piece remains complete and reliable and no vibration is possible between the two pieces. Since the locking position is maintained during a predetermined axial travel of the clip, the risk of sliding between the clip and the mounting tang of the second piece is eliminated in case of voluntary disassembly.

According to a preferred implementation mode, each internal leg comprises a first portion connected to the summit base and is extended by a second portion which is bent back towards the outside of the clip in direction of the summit base, each backward bent portion comprises an elastically deformable folding zone and a blade with free lateral displacement carrying the corresponding catch element. The folding zone ensures an arrangement in which the blade is partially inserted laterally between the first portion and the adjacent external leg, while laterally maintaining a part of the blade at the level of the snapping hook carried by said external leg.

This kind of clip configuration constitutes a simple and reliable implementation mode of the lateral displacement means of the catch elements, and of the actuating means of the displacement towards their locking position.

Other technical characteristics can be used in isolation or in combination: each blade consists of a first section connected to the folding zone, pointing in axial direction of the clip, and a second section laterally inclined towards the inside of the clip when moving axially away from the summit base, the part of the blade held laterally at the level of the clipping hook is positioned along the first blade section; the first portion of each internal leg is provided with tang retention claws which are continually projecting inside the central space; the first portion of each internal leg is provided with a clearance opening for the catch element carried by said internal leg; each catch element has two teeth pointing laterally towards the inside of the clip and connected in transversal direction of the clip by a compression edge laterally curved towards the outside of the clip; and each compression edge has an auxiliary tooth pointing laterally towards the inside of the clip.

In one form thereof, the present invention provides a clip for holding a first and a second piece together, the first piece has an opening in which the clip is snapped and the second piece has a tang for insertion in the opening, the clip including: a summit base; a pair of external lateral legs returned elastically in lateral direction towards the outside of clip, after axial insertion of the external legs in the opening to engage the external legs and to ensure that the clip is snapped in the first piece; a pair of internal lateral legs, each adjacent to an associated external leg, and delimiting, in combination with the summit base a central space for axial insertion of tang between the internal legs; a catch element carried by each internal leg in direction of the central space for retaining the tang in the central space; and the clip is characterized in that each internal leg includes elastic elements for lateral displacement of the corresponding catch element, in order to occupy selectively a locked position projecting inside the central space for axial blocking of tang, or a tang release position away from the central space, and in that the clip is provided with actuating means for the displacement of the catch elements towards their locking positions, which are automatically commanded by snapping the clip in the first piece.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
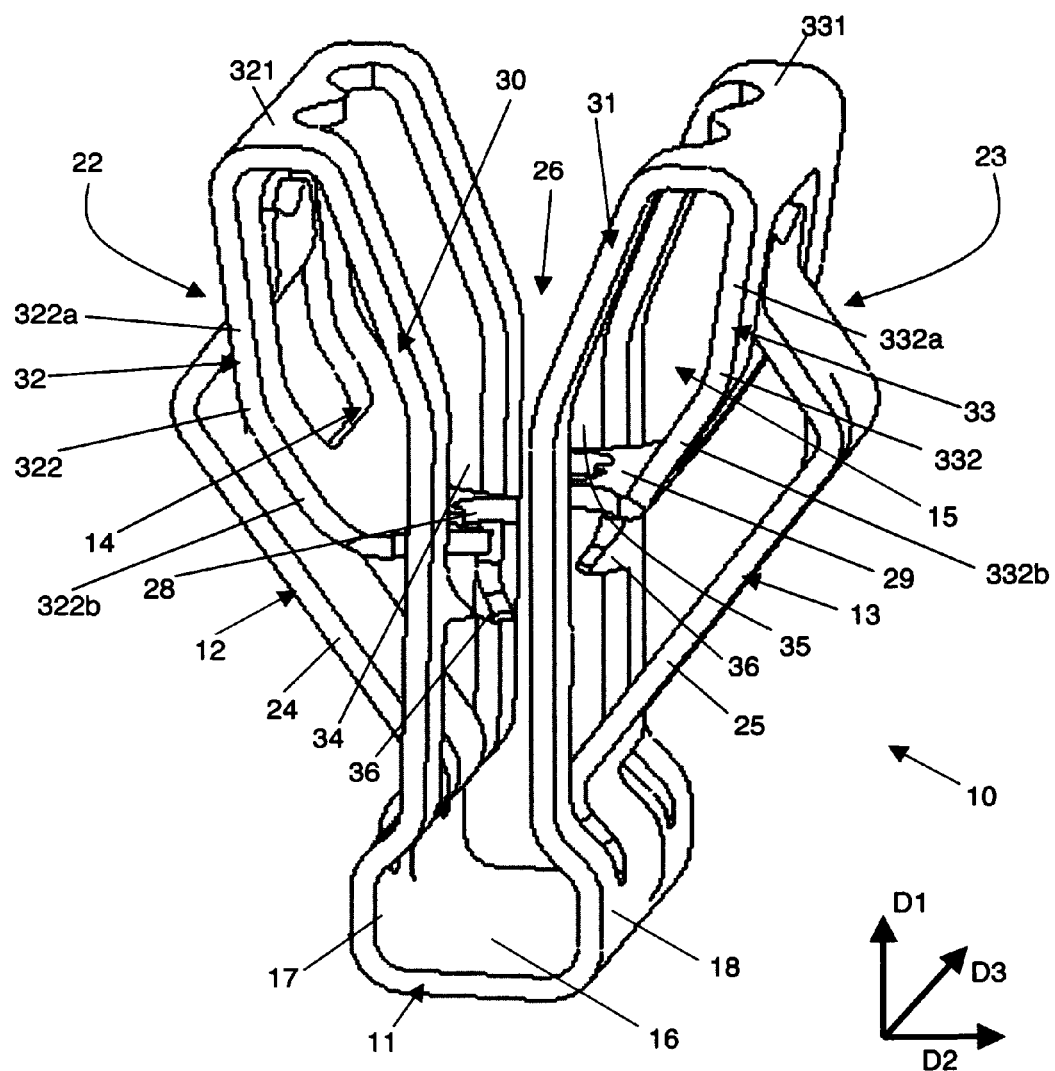
FIG. 1 is an isometric view of an example of a mounting clip according to the invention.
Figure 2:
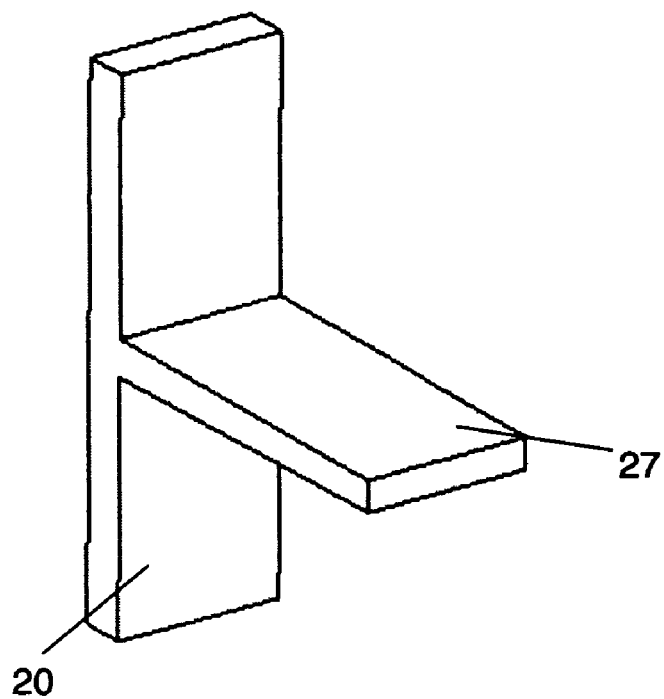
FIGS. 2 and 3 are examples respectively of second and first pieces to be assembled together by means of the clip of FIG. 2.
Figure 3:
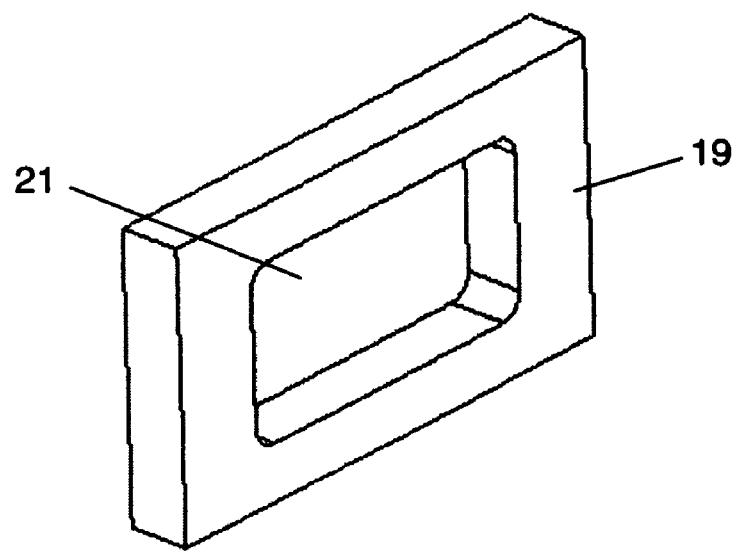

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

In FIGS. 1-6, the illustrated mounting clip 10 has the shape of a saddle with two superimposed U's that overlap each other. The clip 10 consists of a summit base 11, starting from which a pair of flexible external lateral legs 12, 13 are extending in axial direction D1 of clip 10, the legs are offset relative to each other in lateral direction D2 of clip 10. A second pair of internal lateral legs 14, 15, offset relative to each other in lateral direction D2, is arranged between the external legs 12, 13. The internal legs 14, 15 are approximately parallel to each other and are also pointing in axial direction D1. Legs 12 to 15 are all arranged in the same plane including the axial and lateral directions D1, D2.

Two pieces can be fastened together with mounting clip 10; these pieces can be, for instance, parts of an automotive vehicle. The pieces are indicated by reference numbers 19, 20. The first piece 19 (FIG. 3), which has the function of supporting the assembly, has an opening 21 in which clip 10 is axially engaged by snapping it in place. The second piece 20 (FIG. 2) is clasped in the mounting clip 10, prior to the step in which clip 10 is snapped in the first piece 19.

The summit base 11 is in general U shaped, and comprises an intermediate portion 16 included in the lateral direction and in the transversal direction D3 perpendicular to the other two directions. The lateral sides of the intermediate portion 16 are connected with upright edges 17, 18 in axial direction D1.

The external lateral legs 12, 13 are returned elastically in lateral direction D2 towards the outside of clip 10, after axial insertion of said external legs 12, 13 in opening 21 in order to engage the external legs 12, 13 and ensure that clip 10 is snapped in the first part 19. For this purpose, each external leg 12, 13 comprises a hollow shaped clipping hook 22, 23, connected to one of the corresponding upright edges 17, 18 by a flexible blade 24, 25 laterally inclined towards the inside of clip 10 when moving axially towards the summit base 11. For each external leg 12, 13, the clipping hook 22, 23, which in its junction makes approximately a right angle with the associated flexible blade 24, 25, constitutes a snap in place element that passes through the hard point on the edges of opening 21 of the first piece 19. The lateral movement of hooks 22, 23 is specifically the result of the elastic deformation of flexible blades 24, 25.

For each external leg 12, 13, the junction zone between the upright edge 17, 18 of the summit base 11 and the corresponding flexible blade 24, 25 comprises two successive folds, offset in axial direction D1 and with inverse curvature: a first fold is connected to the upright edge 17, 18 and pointing towards the inside of the clip 10, and a second fold is connected to the flexible blade 24, 25 and pointing towards the outside of clip 10. The combined presence of two successive folds has the effect of improving the distribution of mechanical stresses.

The internal lateral legs 14, 15, each laterally adjacent to an associated external leg 12, 13, are delimiting in combination with the summit base 11 a central space 26 for axial insertion, between the internal legs 14, 15, of a retaining tang 27 in the form of a rib on the second piece 20, which is inserted in opening 21. As described further down, each internal leg 14, 15 is carrying a catch element 28, 29 pointing laterally towards the inside of clip 10 in the direction of the central space 26 in order to retain tang 27 in the central space 26.

Each internal leg 14, 15 comprises a first portion connected to the summit base 11, respectively referenced by 30, 31 for legs 14, 15. Each first portion 30, 31 is extended by a second portion 32, 33 bent backwards towards the outside of clip 10 in direction of the summit base 11. Each backward bent portion 32, 33 comprises an elastically deformable folding zone 321, 331 and a blade 322, 332 with free lateral travel carrying the corresponding catch element 28, 29.

Each blade 322, 332 consists of a first section 322a, 332a connected to the folding zone 321, 331, pointing approximately in axial direction D1 of clip 10, and a second section 322b, 332b laterally inclined towards the inside of clip 10 when moving axially towards the summit base 11.

The folding zone 321, 331 ensures that blade 322, 332 is partially inserted laterally between the first portion 30, 31 and the adjacent external leg 12, 13, and at the same time it ensures that part of the blade is positioned laterally at the level of the clipping hook 22, 23 carried by the adjacent external leg 12, 13. The part of the blade positioned laterally at the level of the clipping hook, in other words in the same lateral plane as the back of the clipping hook 22, 23 carried by the adjacent external leg 12, 13, is positioned along the first blade section 322a, 332a, while the rest of the blade 322, 332, specifically the second section 322b, 332b, is laterally inserted precisely between the first portion 30, 31 and the adjacent external leg 12, 13. The catch elements 28, 29 are arranged at the free extremities of the second sections 322b, 332b. The portion of blade 322, 332 which is on the same level as the back of clipping hook 22, 23, is held in place by a passage made laterally through the thickness of the back of clipping hook 22, 23, avoiding any direct contact between said blade part and the clipping hook 22, 23.

The curvature and the elasticity of the folding zones 321, 331, combined with the elastic deformation of blades 322, 332, has for result that each backward bent portion 32, 33 constitutes an elastic element for the lateral displacement of the corresponding catch element 28, 29, so that the latter can selectively vary between a locking position (FIGS. 5 and 6) projecting inside the central space 26 to axially block tang 27, or a release position (FIG. 4) in which tang 27 is retracted from the central space 26, in other words outside space 26. The blade parts maintained laterally at the level of the clipping hooks 22, 23 form actuating means for the displacement of catch elements 28, 29 towards their locking position; these actuating means are automatically commanded by the snapping action of clip 10 in the first piece 19. In the release position, the catch elements 28, 29 are outside space 26 to release tang 27 and to make the latter axially retrievable from space 26.

The associated internal legs 14, 15 and external legs 12, 13, in other words directly adjacent legs, are situated at the same level in transversal direction D3 of clip 10. To allow each catch element 28, 29 to vary between its locking position and its release position, the first portion 30, 31 of each internal leg 14, 15 is provided with a clearance opening 34, 35 for the catch element 28, 29 carried by said internal leg 14, 15.

Figure 4:
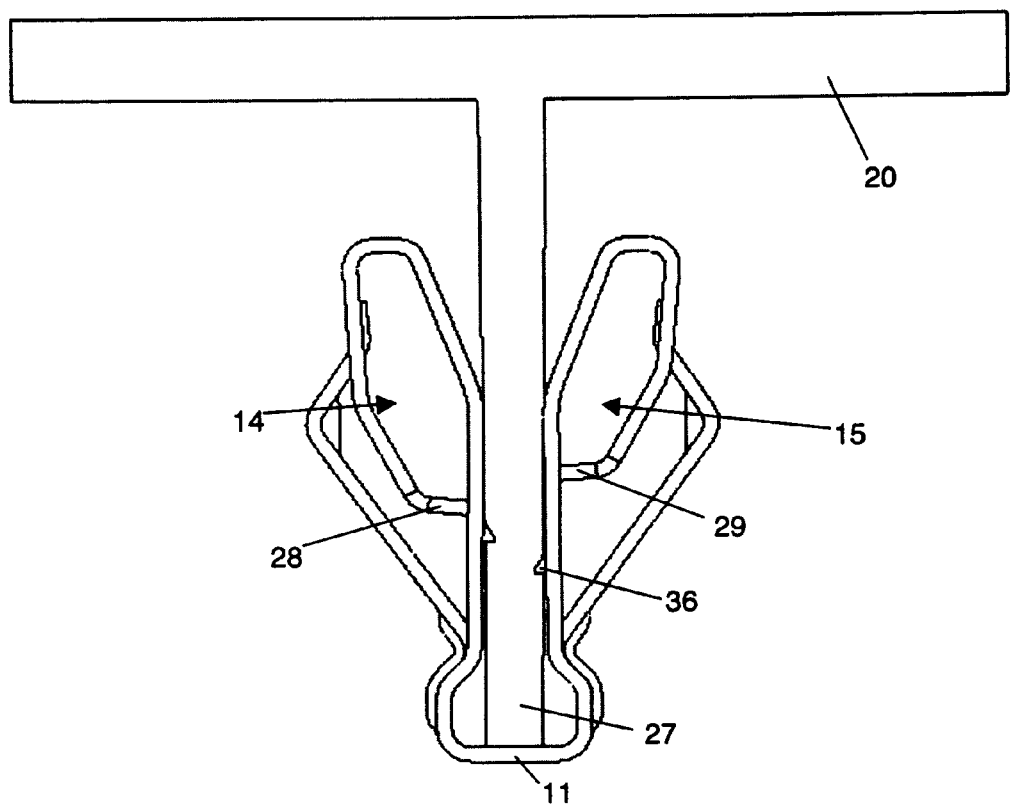
FIG. 4 illustrates the second piece after the first assembly step.
Figure 5:
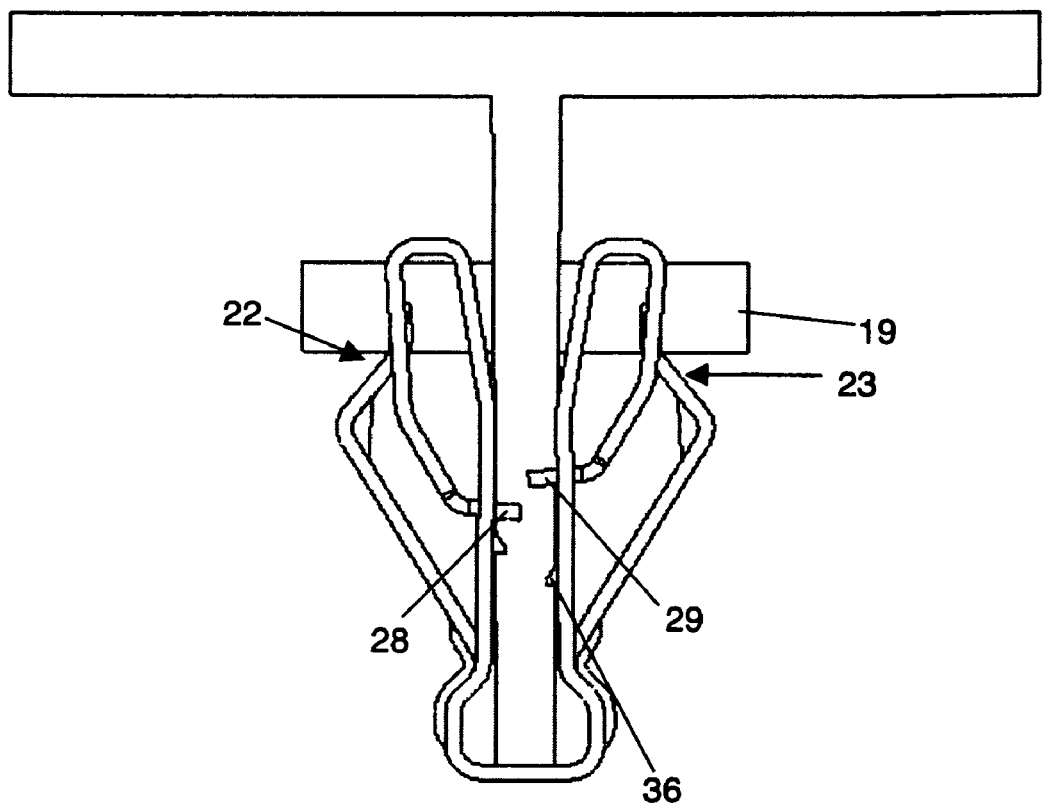
FIGS. 5 and 6 show the clip and the two pieces after the second assembly step.
Figure 6:
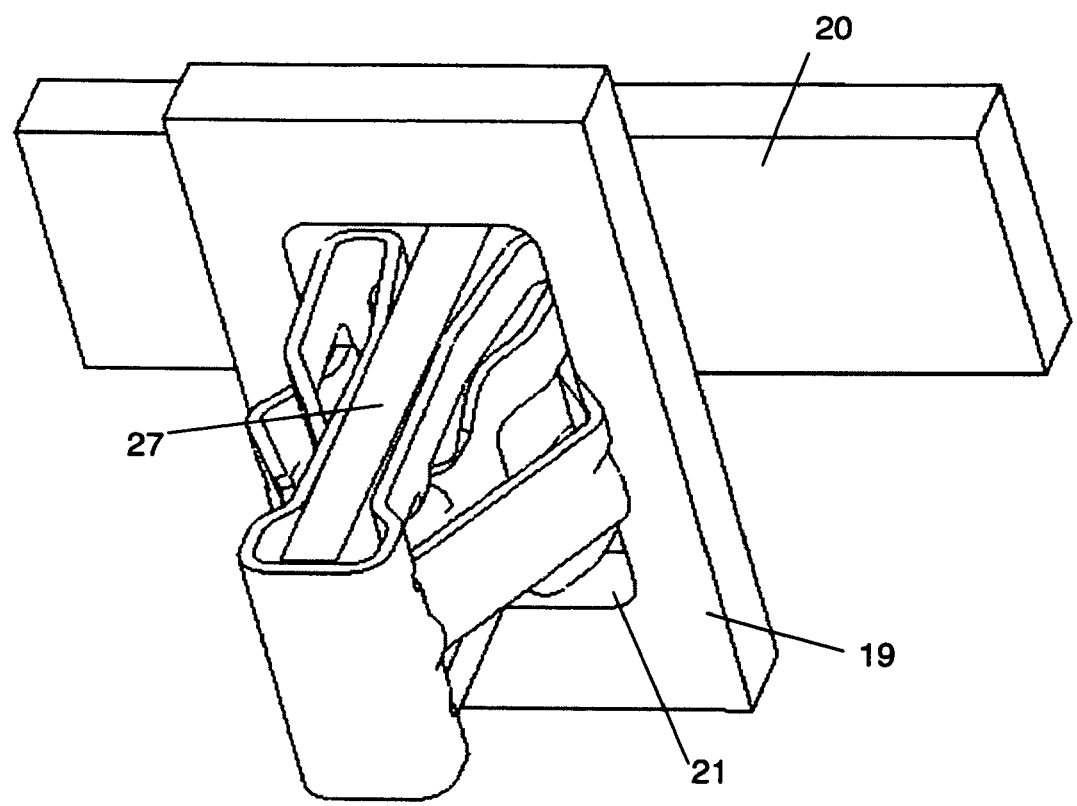

The first portion 30, 31 of each internal leg 14, 15 is provided with retaining claws 36 for tang 27. The retaining claws 36 are pointing towards the inside of the clip 10. Since the central space 26 is laterally delimited by the first portions 30, 31, which are directly opposite each other, the retaining claws 36 project continually inside the central space 36, regardless of the status of clip 10, in other words whether or not it is clipped in the first piece 19, and whether or not the tang 27 of the second piece 20 is inserted in the central space 26. The role of this type of retaining claws 36 is to keep tang 27 in place inside the central space at the moment of its axial insertion, by engaging claws 36 in the external faces of tang 27. The tang 27 is held in place automatically by claws 36 to ensure the pre-assembly of the second piece 20 with clip 10 (first assembly step: FIG. 4) before the displacement takes place of catch elements 28, 29 towards their locking position at the moment clip 10 is snapped on the first piece 19 (second assembly step: FIGS. 5 and 6).

As shown on FIG. 1, each catch element 28, 29 has two primary teeth pointing laterally to the inside of clip 10, which are offset relative to each other in transversal direction D3, and connected in transversal direction D3 of clip 10 by a compression edge which is laterally curved towards the outside of the clip 10. In the shown variant, each compression edge comprises an auxiliary tooth pointing laterally towards the inside of clip 10. The extremity of the auxiliary tooth is offset towards the outside of clip 10 relative to the extremities of the main teeth.

The primary teeth and the curved compression edge have distinct functions. The pointed teeth constitute an aggressive zone in which the penetration of catch elements 28, 29 in tang 27 is rapidly initiated, while the role of the curved compression edges is to increase progressively the contact surface between the catch elements 28, 29 and tang 27. The deep penetration of the primary teeth increases the mechanical retention of the assembly. The auxiliary tooth is used in case the material of tang 27 is relatively soft, and forms a safety element extenuating the weak mechanical resistance of tang 27.

In a first assembly step (FIG. 4), the tang 27 is axially inserted in central space 26, between internal legs 14, 15. Thanks to the pre-assembly retention claws 36 provided on the first portions 30, 31 of the internal legs 14, 15 that penetrate laterally in tang 27 during its axial insertion, clip 10 is automatically connected to the second piece 20, but the axial retention is not yet maximum.

Then, in a second assembly step (FIGS. 5 and 6), the axial insertion in opening 21 of first piece 19 of the external legs 12, 13 of clip 10, accompanied by tang 27 of the second piece 20, provokes a lateral approach of the external legs 12, 13, more precisely clipping hooks 22, 23 move towards each other. This movement of hooks 22, 23 occurs by flexion of the flexible blades 24, 25, and continues until the hard point is passed between blades 24, 25 and hooks 22, 23. Beyond that, the elastic return of flexible blades 24, 25, combined with the edge inclination of the hooks 22, 23 provokes axial sliding of clip 10 along the opening 21 until the clipping hooks 22, 23 of external legs 12, 13 engage in the edges of opening 21 of the first piece 19. The dimensions of opening 21 in lateral direction D2 are slightly smaller than the distance between the clipping hooks 22, 23 when the external legs 12, 13 are in their natural configuration, in other words free of outside stresses. In this way, when the hooks 22, 23 are engaged in the edges of opening 21, the external legs 12, 13 are slightly deformed towards the inside of clip 10, so that they are naturally returned towards the outside in permanent manner, ensuring that clip 10 snaps in the first piece 19.

In complementary manner, the part of blade 322, 332 intended to be arranged laterally at the same level as the back of the clipping hook 22, 23 of the adjacent external leg 12, 13, occupies this position specifically when said external leg 12, 13 is in its natural configuration. The result is that in snapped position of clip 10, the parts of blades 322, 332 intended to be at the same lateral level as hooks 22, 23 are drawn closer together laterally (through deformation of the folding zones 321, 331 possibly combined with deformation of the blade 322, 332) at the same rate as clipping hooks 22, 23 are drawn closer together. This rapprochement of the parts of the first section 322a, 332a of blade 322, 332 provokes a rapprochement which is proportionally greater than the rapprochement of catch elements 28, 29.

The insertion of catch elements 28, 29 in tang 27 takes place when tang 27 is already axially in place in the central space 26. The assembly causes no deterioration.

Since the edges of hooks 22, 23 on the side of the junction to the flexible blades 24, 25 are inclined, in the assembled state they have the effect of creating permanent axial compression between pieces 19, 20. If a force is applied axially on tang 27 tending to move pieces 19, 20 away from each other, the inclined edges of hooks 22, 23 provoke an automatic return of pieces 19, 20 against each other. During all or part of the axial displacement of the inclined edges of hooks 22, 23 along opening 21 before the inverse crossing of the hard point, in function of the length of the first section 322a, 332a of blade 322, 332, the catch elements 28,29 remain in locked position. In this way, contrary to prior art, the mounting of clip 10 to the second piece 20 is firmly maintained at the beginning of the axial withdrawal of clip 10 relative to opening 21 of the first piece 19.

For disassembly, sufficient axial force must be applied on tang 27 to cross the hard point between hooks 22, 23 and flexible blades 24, 25. The snapping of clip 10 in the first piece 19 comes to an end at the moment that the hard point is passed, and the catch elements 28, 29 return elastically to their positions in which tang 27 is released.

As an example, clip 10 is made by cutting and bending sheet metal with relatively small thickness, which underwent suitable heat treatment to give it elastic properties. The second piece 20 and more specifically retaining tang 27 are made of a softer material than the catch elements 28, 29 of clip 10 in order to allow the primary and auxiliary teeth of the latter to dig into the material of tang 27. For instance, the selected material can be an injectable thermoplastic material.

The V configuration of the flexible blades 24, 25 and of the second sections 322b, 332b facilitates the installation of the clip in the first piece 19. On the other hand, in the proximity of the two backward bent portions, the first portions 30, 31 are laterally inclined towards the inside of clip 10 when moving closer to the summit base 11 in order to form a V facilitating the insertion of tang 27 in space 26.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A clip for holding a first and a second piece together, the first piece having an opening in which the clip is received and the second piece having a tang for insertion in the opening, said clip comprising:

a summit base;

a pair of external lateral legs returned elastically in a lateral direction towards an outside of said clip, said external legs engageable with the first piece upon axial insertion of said external legs in the opening;

a pair of internal lateral legs, each disposed adjacent to an associated said external leg and defining, in combination with said summit base, a central space for axial insertion of the tang between said internal legs, each said internal leg having a catch element projecting into said central space for retaining the tang in said central space;

each internal leg further including elastic elements for lateral displacement of the corresponding said catch elements between a locked position in which said catch elements project inside said central space for axial blocking of the tang and a tang release position in which said catch elements are disposed away from said central space;

actuating means for displacing said catch elements towards said locked position, said actuating means actuable by snapping said clip in the first piece; and each internal leg further comprising a first portion connected to said summit base and extended by a second portion bent backwards towards the outside of said clip in direction of said summit base, each backward bent portion comprising an elastically deformable folding zone and a blade carrying the corresponding said catch element, said folding zone positioning the blade when partially inserted within the opening laterally between said first portion of said adjacent external leg, while a portion of said blade is positioned laterally at a level of a clipping hook carried by said external leg.

2. The clip of claim 1, wherein each blade comprises a first section connected to said folding zone and pointing in an axial direction of said clip, and a second section laterally inclined towards an inside of said clip when moving axially towards said summit base, and wherein said portion of said blade maintained laterally at said level of said clipping hook is positioned along said first section of said blade.

3. The clip of claim 1, wherein said first portion of each said internal leg is provided with retention claws for the tang, said retention claws projecting inside said central space.

4. The clip of claim 1, wherein said first portion of each internal leg is provided with a clearance opening for said catch element carried by said internal leg.

* * * * *